US006700622B2

(12) United States Patent
Adams et al.

(10) Patent No.: US 6,700,622 B2
(45) Date of Patent: *Mar. 2, 2004

(54) METHOD AND APPARATUS FOR DETECTING THE SOURCE FORMAT OF VIDEO IMAGES

(75) Inventors: Dale R. Adams, San Jose, CA (US); Laurence A. Thompson, Saratoga, CA (US)

(73) Assignee: DVDO, Inc., Campbell, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,543

(22) Filed: Oct. 1, 1999

(65) Prior Publication Data

US 2003/0098924 A1 May 29, 2003

Related U.S. Application Data

(60) Provisional application No. 60/102,946, filed on Oct. 2, 1998.

(51) Int. Cl.[7] .................................................. H04N 7/01
(52) U.S. Cl. ....................................... 348/448; 348/452
(58) Field of Search ................................. 348/452, 448, 348/558, 700, 607, 449

(56) References Cited

U.S. PATENT DOCUMENTS

| 5,448,554 | A | * | 9/1995 | Van Steenbrugge | 370/17 |
|---|---|---|---|---|---|
| 5,530,484 | A | * | 6/1996 | Bhatt et al. | 348/556 |
| 5,550,592 | A | * | 8/1996 | Markandey et al. | 348/448 |
| 5,563,651 | A | * | 10/1996 | Christopher et al. | 348/97 |
| 5,963,261 | A | | 10/1999 | Deam | |
| 6,058,140 | A | * | 5/2000 | Smolenski | 375/240 |
| 6,222,589 | B1 | * | 4/2001 | Faroudja et al. | 348/448 |

* cited by examiner

Primary Examiner—Victor R. Kostak
(74) Attorney, Agent, or Firm—Perkins Coie LLP

(57) ABSTRACT

A digital image processor is provided. The digital image processor includes a deinterlacing processor that is implemented upon a digital processing unit. The deinterlacing processor is coupled to an input operable to receive an interlaced video stream, a digital memory for storing portions of the interlaced video signal, and an output operable to transmit a deinterlaced video stream. The deinterlacing processor is operable to detect the source type of the received interlaced video stream to generate the deinterlaced video stream having reduced or no motion artifacts.

20 Claims, 14 Drawing Sheets

METHOD AND APPARATUS FOR DETECTING THE SOURCE FORMAT OF VIDEO IMAGES

CROSS REFERENCE TO RELATED APPLICATIONS

This application claims the benefit of U.S. Patent Provisional Application No. 60/102,946 filed on Oct. 2, 1998, and is related to U.S. patent application Ser. No. 09/167,527 filed on Oct. 6, 1998, both of which are incorporated herein by reference.

BACKGROUND OF THE INVENTION

1. Field of the Invention

The present invention relates generally to the processing of video images and, more particularly, to techniques for deinterlacing video images.

2. Description of the Related Art

All major television standards use a raster scanning technique known as "interlacing" or "interlace scanning." Interlace scanning draws horizontal scan lines from the top of the screen to the bottom of the screen in two passes. Each pass is known as a field. In the National Television System Committee (NTSC) standard used in North America, each field takes approximately $1/60^{th}$ of a second to draw.

Interlace scanning depends on the ability of the cathode ray tube (CRT) phosphors to retain an image for a few milliseconds, in effect acting like a "memory" to retain the previous field while the newer interleaved field is being scanned. Interlace scanning provides a benefit in television systems by doubling the vertical resolution of the system without increasing broadcast bandwidth.

FIG. 1 shows a number of parallel horizontal scan lines 10 on a conventional television display. A first set of horizontal lines 12 is scanned in a first field period and then a second set of horizontal lines 14 is scanned in a second field period. Thus, the first field is temporarily shifted by $1/60^{th}$ of a second from the second field. When rapidly changing images are being displayed, an object in motion may appear to be fuzzy due to the temporal displacement between the two fields.

This temporal displacement typically does not create a problem on conventional television displays, primarily because the image of the "older" field quickly fades in intensity as the light output of the phosphors decays. A secondary reason is that the spatial displacement in the images caused by motion results in a fine detail that television displays do not resolve well. For these reasons, interlace scanning of motion pictures works acceptably well on conventional television displays.

FIG. 2 shows a set of progressively scanned horizontal lines 16. In progressive scanning, all horizontal lines 16, are scanned out in one vertical pass 18, so there is no time displacement of adjacent lines as in interlace scan. Progressive scanning requires a much higher bandwidth signal. Consequently, progressive scanning is typically used for applications where improved image quality and higher resolution are required, relative to conventional television systems. Progressive scanning is widely used in computer CRTs and liquid crystal displays (LCD).

If a motion picture formatted for an interlaced monitor device as in FIG. 1 is to be displayed on a progressively scanned device as in FIG. 2, then it must be converted from the interlaced format to the progressive format. This format conversion is known as deinterlacing. FIG. 3 is an illustration of a deinterlace process 19 of the prior art. A first series of interlaced video fields 20 is generated by a video source (not illustrated) at $1/60^{th}$ second intervals.

In this example, each of the video fields 20 has a spatial resolution of 720 horizontal by 240 vertical pixels. Each field contains half the vertical resolution of a complete video image. The first series of video fields 20 are input to a deinterlace processor 22, which converts the 720 by 240 interlaced format to a second series of video fields 24. In this example, each of the second series of video fields 24 may have 720 by 480 pixels where the fields are displayed at 60 frames per second.

FIG. 4 is an illustration of a prior art method of deinterlace processing, which uses field combination to deinterlace an image using multiple fields. A video field 26 containing scan lines 30, and a previous video field 28 containing scan lines 32 is fed into a field combination deinterlace processor 34. The result is a combined frame 36 with scan lines 38 sourced from video field 26 and scan lines 40 sourced from video field 28. When this simple deinterlacing of the prior art is performed, and a motion picture formatted for an interlace display is converted to a progressive format, a noticeable "artifact" or error arises because the image content of vertically adjacent lines is time shifted by $1/60^{th}$ second as noted previously. The error is most visible around the edges of objects that are in motion.

FIG. 5 is an illustration of a prior art method of deinterlace processing, which uses line interpolation to deinterlace an image using a single reference field. The method 42 interpolates or doubles the number of lines of one field to produce a progressive frame. A video field 44 is scanned from an image to contain a half set of lines 46. The half set of lines 46 is deinterlaced by line interpolation in a deinterlacing interpolator 48.

The resulting frame 50 will have all the lines 46 of the original video field 44. The remaining lines 52 are created by interpolation of lines 46. The resultant image will not have motion artifacts because all the lines in the image will be created from lines 46 that are time correlated. This alternative method 42 of deinterlacing does not produce motion artifacts, but the vertical resolution of the image is reduced by half.

FIG. 6 shows a deinterlaced image 54 with a stationary object 55 that is rendered without distortion. FIG. 7 shows an image 56 with the object 55' in motion. The edges of object 55' create artifacts 57 on the edges of the image 54 because of the aforementioned temporal shift. These artifacts 45 are introduced into the image by the conventional field combination deinterlacing method 25 of FIG. 4.

Motion artifacts in deinterlaced video images will have characteristics that vary depending on the original source of the motion picture. Video cameras, such as those used for television broadcasts, update motion in each field produced so that fields at 60 Hertz (Hz) will have motion updated at 60 Hz. But motion pictures from other sources are commonly displayed as video, which requires a conversion a different type of motion picture to video. For example, movies originally shot as film must be converted to video for display on a television set. Since film is originally shot at 24 frames per second, maximum update rate for motion for a film source is 24 Hz.

A film source may be viewed as a series of still image frames that are displayed in series at the rate of 24 per second. Film is converted to video in a two step process. First, each of the original film frames must be converted to video fields. Secondly, the video fields must be sequenced in a way that allows them to be displayed at 60 Hz for the NTSC video standard or at 50 Hz for the phase alternation line (PAL) standard. The conversion from film to NTSC video is known as 3:2 pulldown. The conversion of film to PAL video is known as 2:2 pulldown.

FIG. 8 illustrates a diagram of a method 58 for converting film into video of the prior art. A film frame 60 is digitized according to a standard for digital video known at ITR-R BT.601, which specifies the number of horizontal samples per line and the number of lines per field. The film frame 60 is shown with a horizontal by vertical resolution of 720×480, which is the approximate resolution specified by ITU-R BT.601 for NTSC video. (Note: this discussion assumes that film is being converted to a digital format. This may not always be the case but the explanation of 3:2 or 2:2 pulldown applies whether or not the film is digitized.)

Each film frame 60 contains the fall vertical resolution of the image. Since video fields contain half the vertical resolution, each film frame will be converted into two video fields. Assuming the horizontal lines of frame 60 are numbered in sequence from top to bottom, the white bands indicate even numbered lines 62 in the original film frame and the gray bands indicate odd numbered lines 64. When the frame is converted to fields, the even lines 62 are assembled into a first video field 66 and the odd lines 64 are assembled into a second video field 68. The field 66 is shown as white and the field 68 is shown in gray in the figures to indicate whether they contain the even numbered lines 62 or odd numbered lines 64 of the original frame 60.

The significance of the method 58 is that the video fields 66 and 68 created from the original film frame 60 are time correlated. In other words, the image contained in the film frame 60 is a "snapshot" in time; so there is no motion displacement between the even field 66 and odd field 68 that are derived from the same original film frame 60. This is not the case with video that was originally shot with video cameras, such as those used for television. Video cameras update motion in every field, and there are no "frames." As mentioned previously, film has 24 frames per second and NTSC video uses 60 fields per second. The ratio of 24:60 equals 2:5. This means that for every 2 frames in the film source, 5 video fields must be created.

FIG. 9 illustrates a prior art method 70 providing for 3:2 pulldown (converting film frames to NTSC video fields). A time sequential series of film frames 72 at 24 frames per second are converted to even and odd fields. The fields are then displayed as video fields 74 at 60 fields per second. From FIG. 9 it is illustrated that Fields 1, 2, and 3 originate from Frame 1; Fields 4 and 5 originate from Frame 2, and so forth. Therefore, five fields are created from two film frames in order to achieve the 24/60 ratio of film frames to video fields.

The fields 74 are then assembled into a series of deinterlaced frames 76 by the method 46 shown in FIG. 5, which performs deinterlacing by combining the most recent two video fields into a single frame. Fields 1 and 2 are combined to create DI Frame 1; Fields 2 and 3 are combined to create DI Frame 2; Fields 3 and 4 are combined to create DI Frame 3, and so forth. Since Fields 1 and 2 came from the same original film frame, there will be no motion artifacts in DI Frame 1 because Fields 1 and 2 are time correlated. There will be no motion artifacts in DI Frame 2 because Fields 2 and 3 come from the same film frame and are time correlated.

However, DI Frame 3 is the combination of Fields 3 and 4. Because Field 3 comes from film Frame 1 and Field 4 comes from film Frame 2, there may be motion artifacts because the two fields come from different original film frames. The diagram in FIG. 9 shows a heavy border around the deinterlaced frames 76 that result from the combination of fields from different original film frames and may have motion artifacts. The deinterlaced frames 76 with light borders will not have artifacts.

FIG. 10 illustrates a prior art method 78 providing for 2:2 pulldown (converting computer rendered animation to NTSC video fields). The animation motion picture forms a series of frames 80 at a rate of 30 frames per second. The series of frames 80 is converted to video fields 82 at a rate of 60 per second. 2:2 pulldown is also used to convert film at the rate of 24 frames per second to PAL video fields at 48 fields per second. The PAL video fields are then displayed 50 fields per second.

FIG. 10 further illustrates that when the video fields 82 are converted by a deinterlace processor by combining the two most recent field pairs into series of frames 84, that motion artifacts may appear in half the deinterlaced frames. DI Frames 1, 3, 5, 7, and 9 are created from pairs of fields that originally come from the same frame and so will be free of artifacts, but DI Frames 2, 4, 6, and 8 are created from fields that come from different original frames and can have artifacts.

The 24 frame per second series of frames 72 of FIG. 9 and the 30 frame per second series of frames 80 of FIG. 10 have a characteristic in common: they are types of motion pictures sources that have full resolution frames from which time correlated even and odd fields are derived during the conversion to video. This type of source is referred to in this document as a "progressive frame source."

The purpose of a deinterlace processor is to create progressively scanned frames from a series of interlaced video fields. If the original source of the motion picture is a type that has time correlated fall resolution frames, then knowledge of this type of source will be useful to a deinterlace processor. In view for the foregoing, it is desirable for a deinterlace processor to have a method for determining the original motion picture type from the series of input video fields, so that the deinterlace processing may be optimized for the source type.

SUMMARY OF THE INVENTION

The present invention fills these needs by providing a method and apparatus for deinterlacing a video input stream by analyzing the video stream to determine if the video stream originated from a progressive scanned source. It should be appreciated that the present invention can be implemented in numerous ways, including as a process, an apparatus, a system, a device or a method. Several inventive embodiments of the present invention are described below.

In one embodiment of the present invention, a digital image processor is provided. The digital image processor includes a deinterlacing processor that is implemented upon a digital processing unit. The deinterlacing processor is coupled to an input operable to receive an interlaced video stream, a digital memory for storing portions of the interlaced video signal, and an output operable to transmit a deinterlaced video stream. The deinterlacing processor is operable to detect the source type of the received interlaced video stream to generate the deinterlaced video stream having reduced or no motion artifacts.

In another embodiment of the present invention, a method for deinterlacing an interlaced video stream is provided. The method includes receiving a set of video fields from an input of the interlaced video stream. The set of video fields is analyzed to determine a source type of said interlaced video stream. If the source type of the interlaced video stream contains progressive frames, then the sequencing the interlaced video stream is detected. The set of video fields is then assembled into a deinterlaced video frame with reduced or no motion artifacts using the source type and the sequencing of said interlaced video stream as a control.

An advantage of the present invention is that it allows for reduction of motion artifacts in video images. By identifying the type of the source motion picture, a video deinterlacer can use the information to combine frames that are time correlated. The result is a video image that is free of artifacts.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A method and apparatus for detection of the original source type of motion picture of a series of video input fields is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
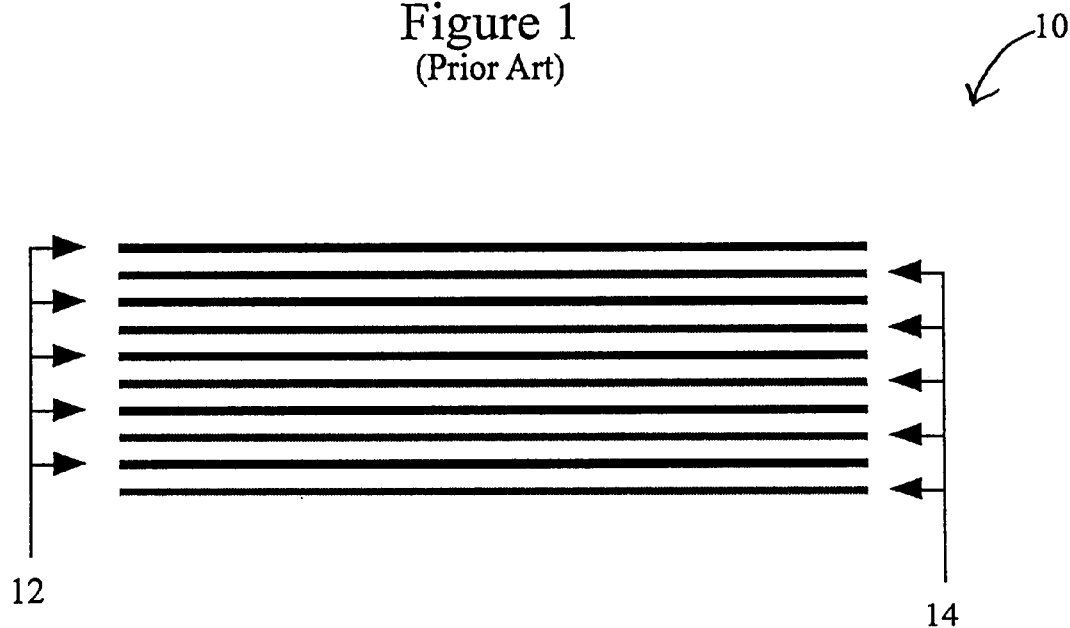
FIG. 1 shows a number of parallel horizontal scan lines on a conventional television display.
Figure 2:
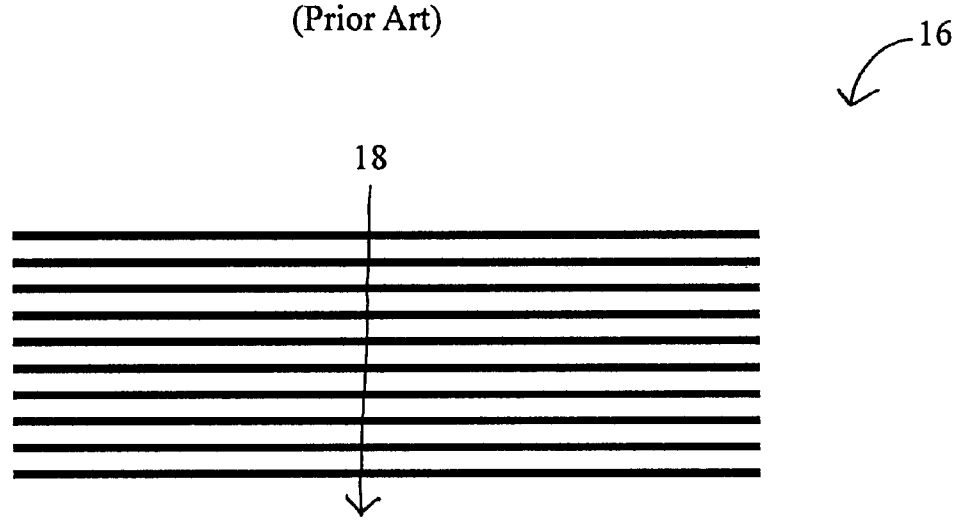
FIG. 2 shows a set of progressively scanned horizontal lines in a prior art progressive scan display.
Figure 3:
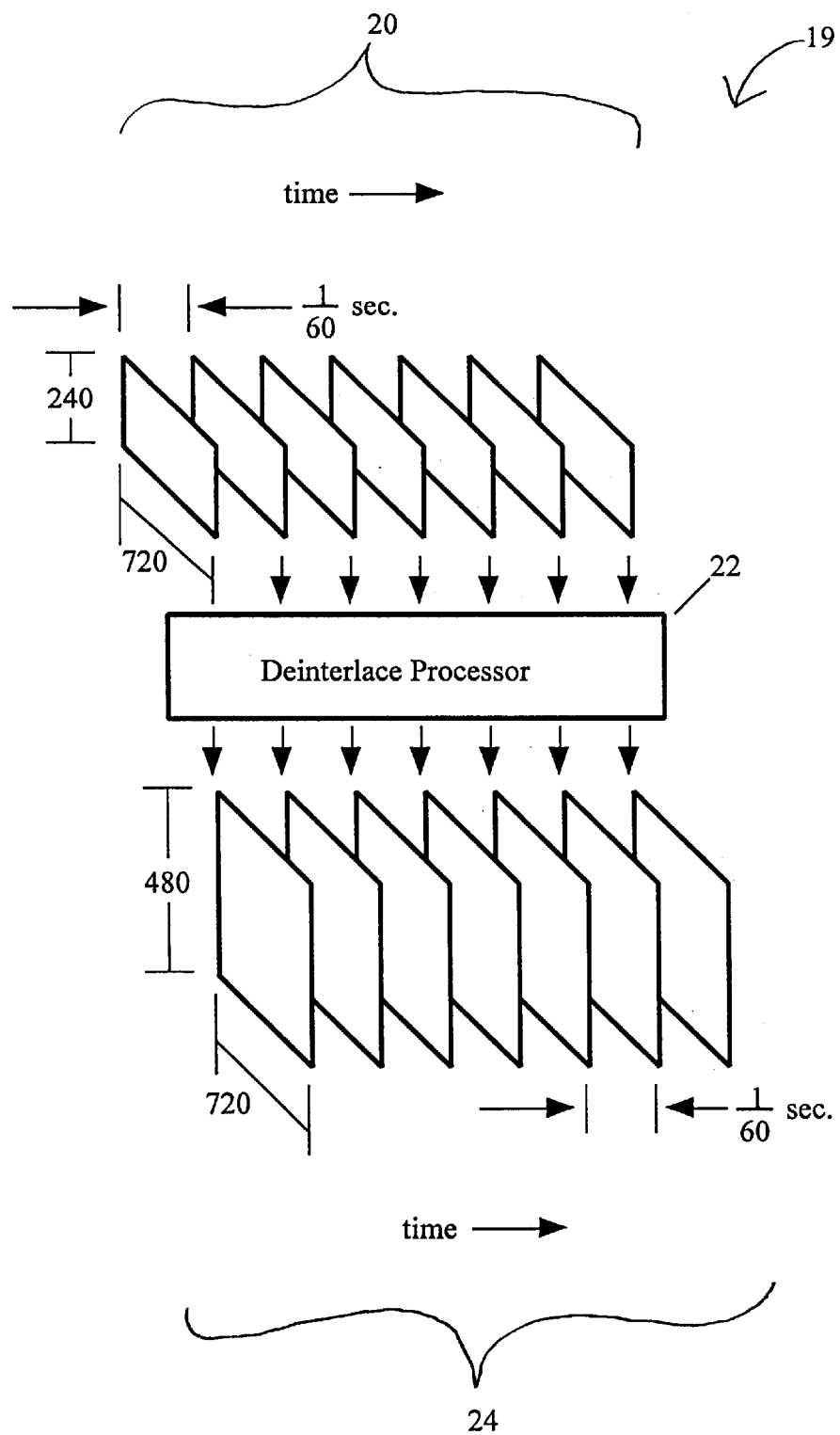
FIG. 3 is an illustration of a deinterlace process of the prior art.
Figure 4:
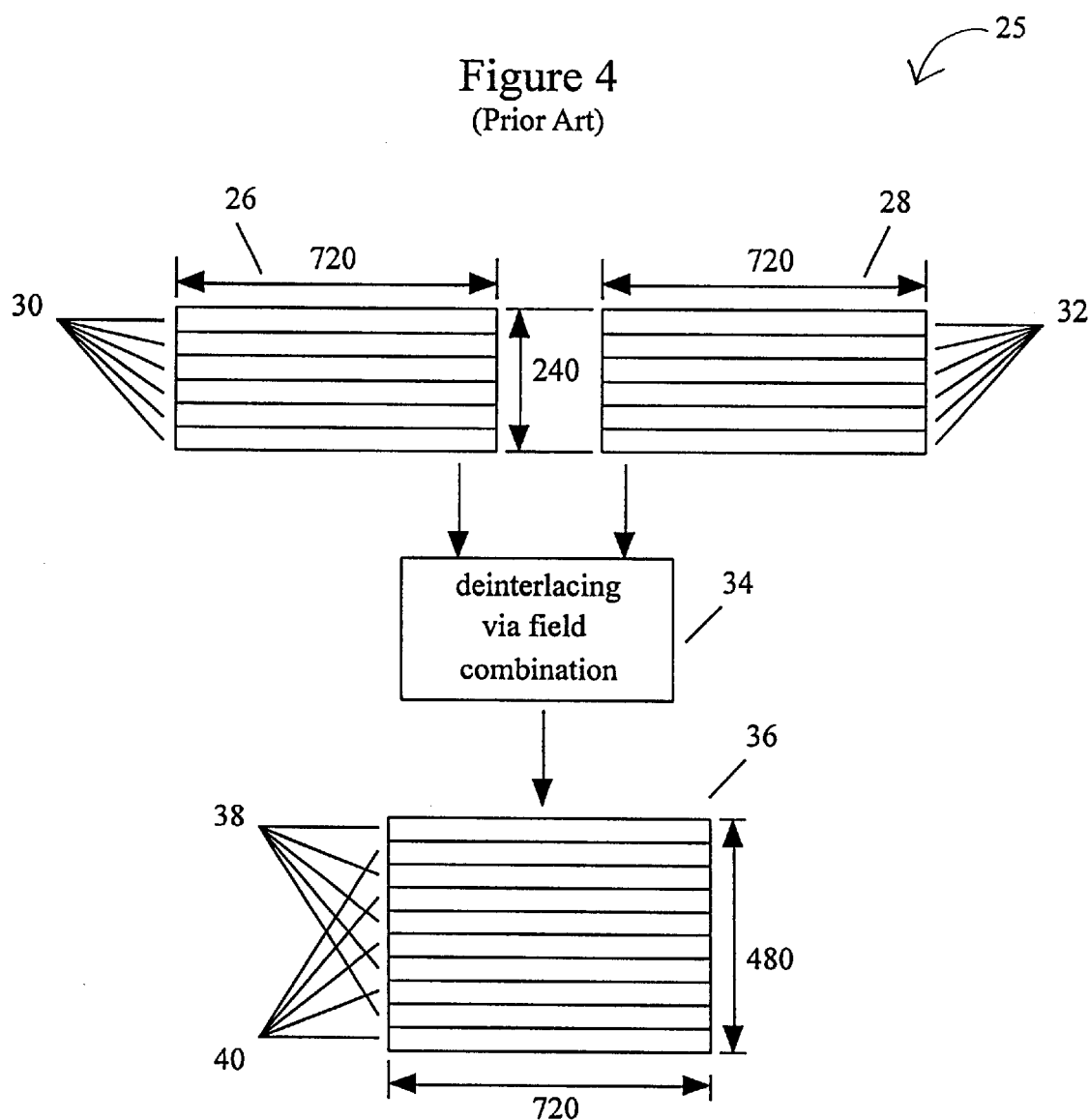
FIG. 4 is an illustration of a prior art method of deinterlace processing, which uses field combination to deinterlace an image using multiple fields.
Figure 5:
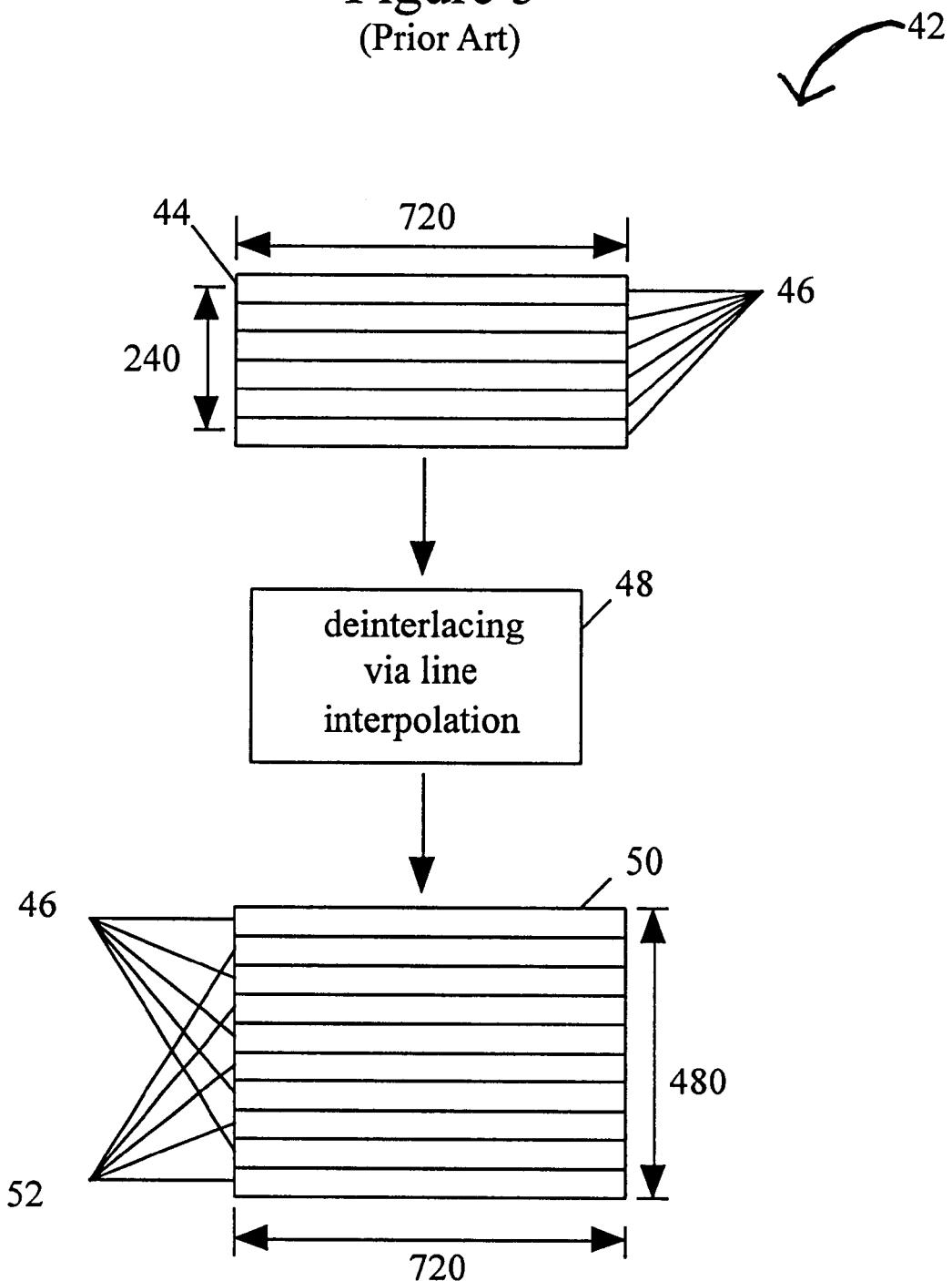
FIG. 5 is an illustration of a prior art method of deinterlace processing, which uses line interpolation to deinterlace an image using a single reference field.
Figure 6:
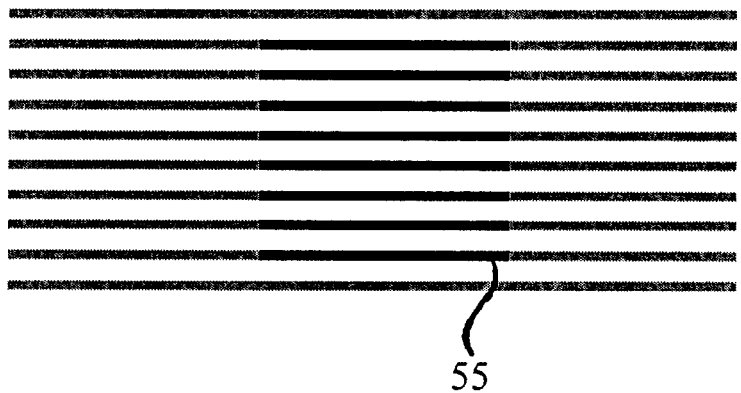
FIG. 6 shows a deinterlaced image of the prior art with a stationary object.
Figure 7:
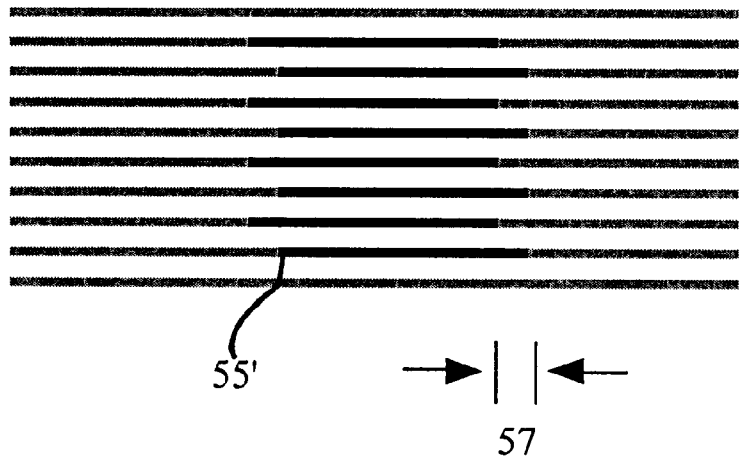
FIG. 7 shows a deinterlaced image of the prior art with an object in motion, creating undesirable "artifacts."
Figure 8:
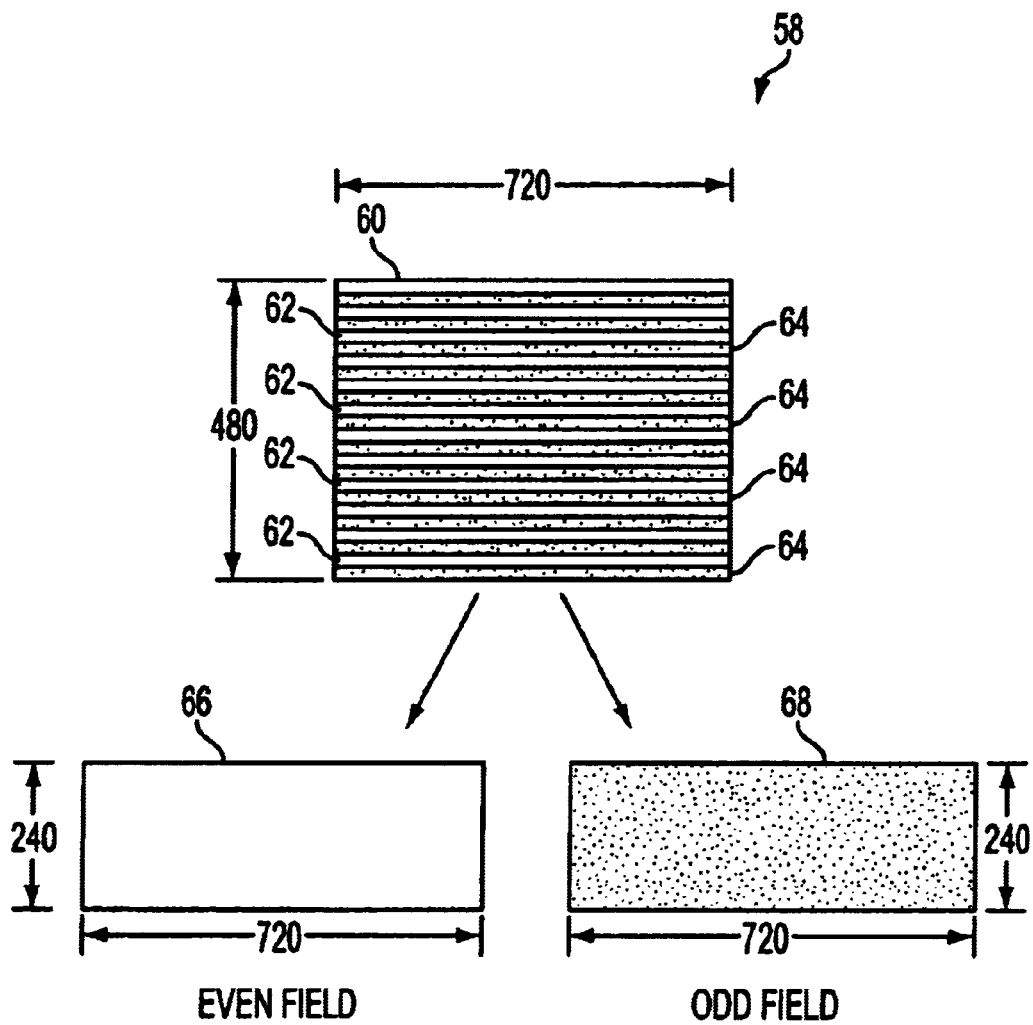
FIG. 8 illustrates a diagram of a method for converting film into video of the prior art.
Figure 9:
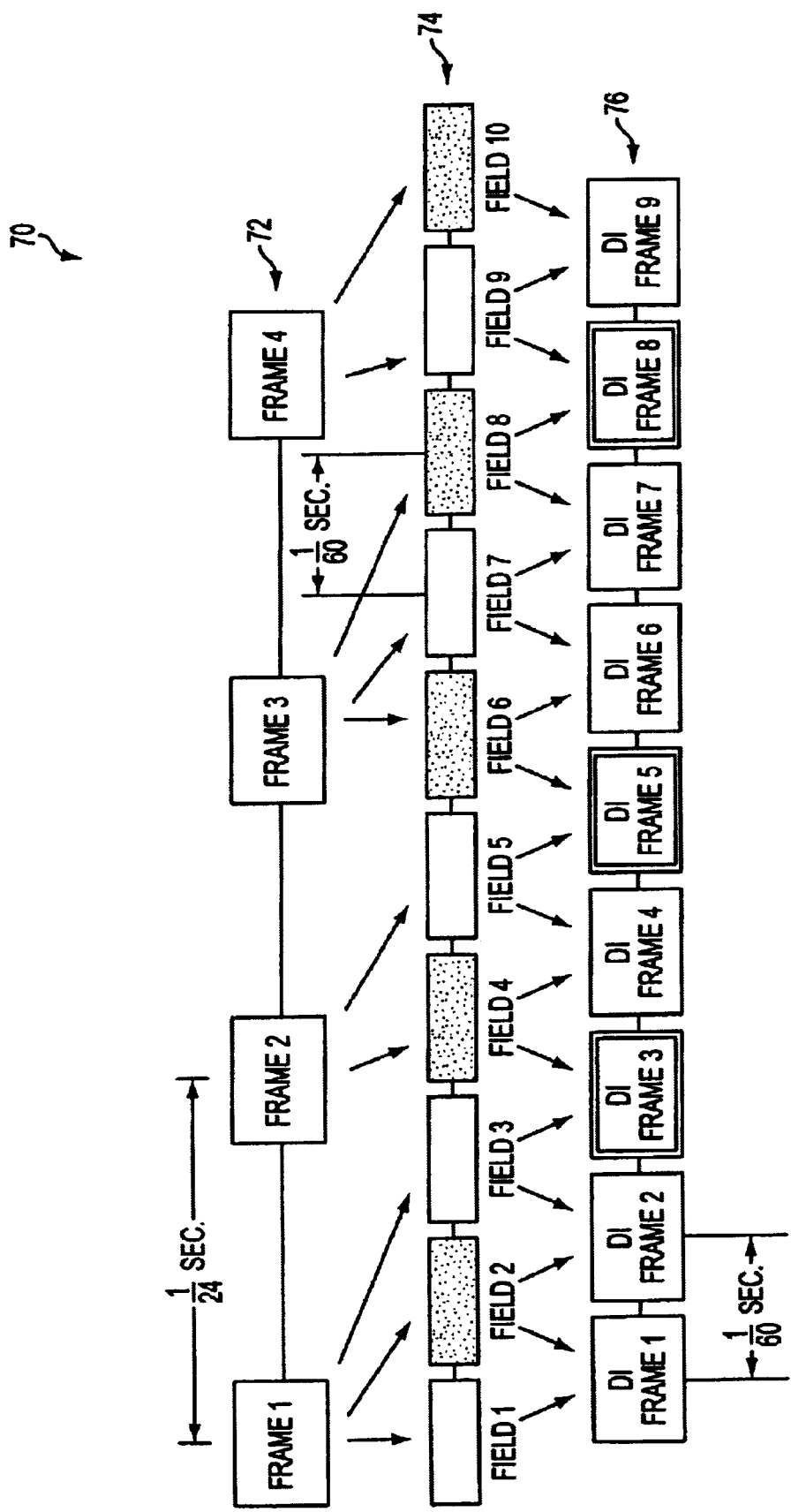
FIG. 9 illustrates a prior art method providing for 3:2 pulldown (converting film frames to NTSC video fields).
Figure 10:
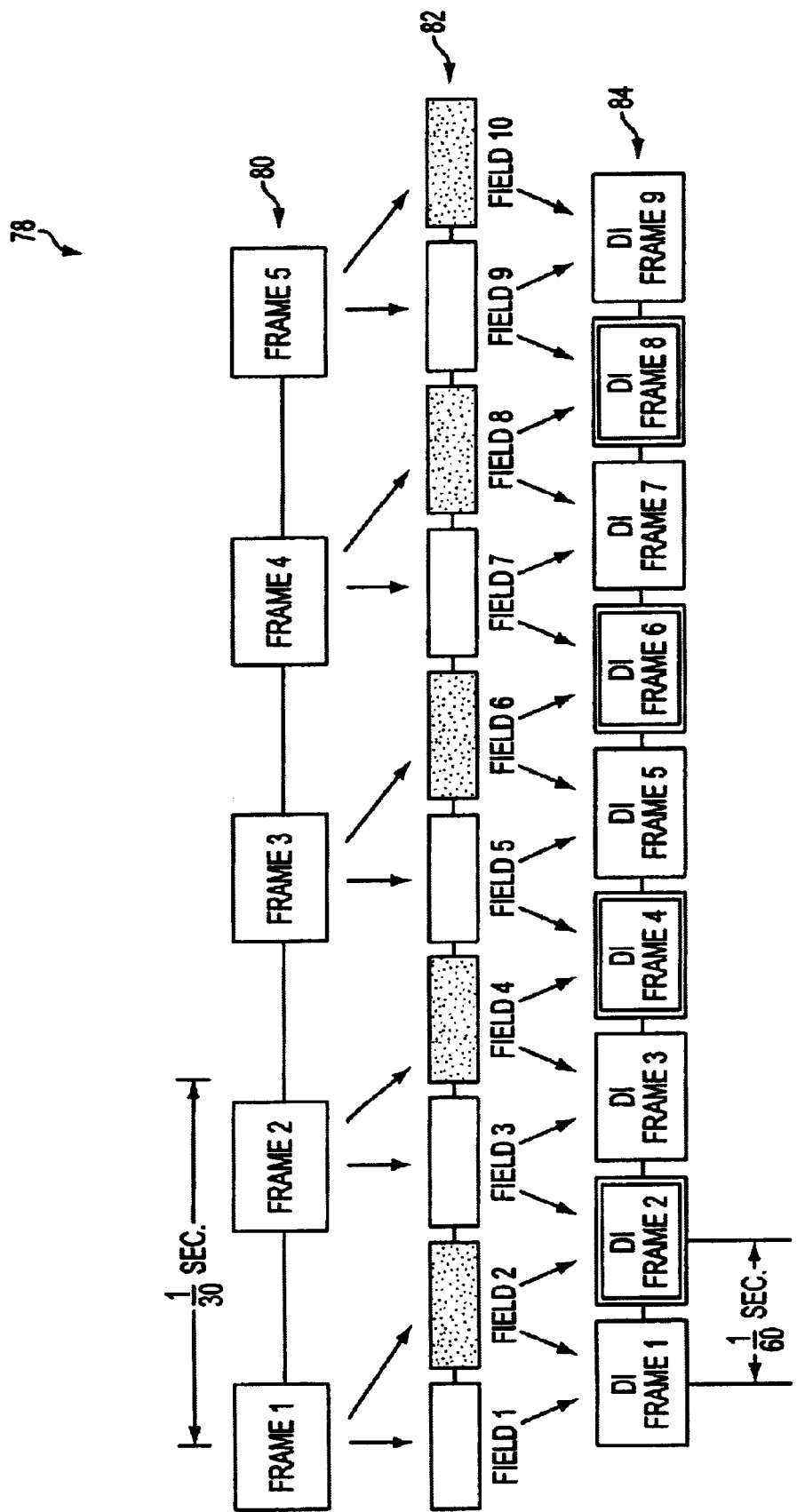
FIG. 10 illustrates a prior art method providing for 2:2 pulldown (converting computer rendered animation to NTSC video fields).
Figure 11:
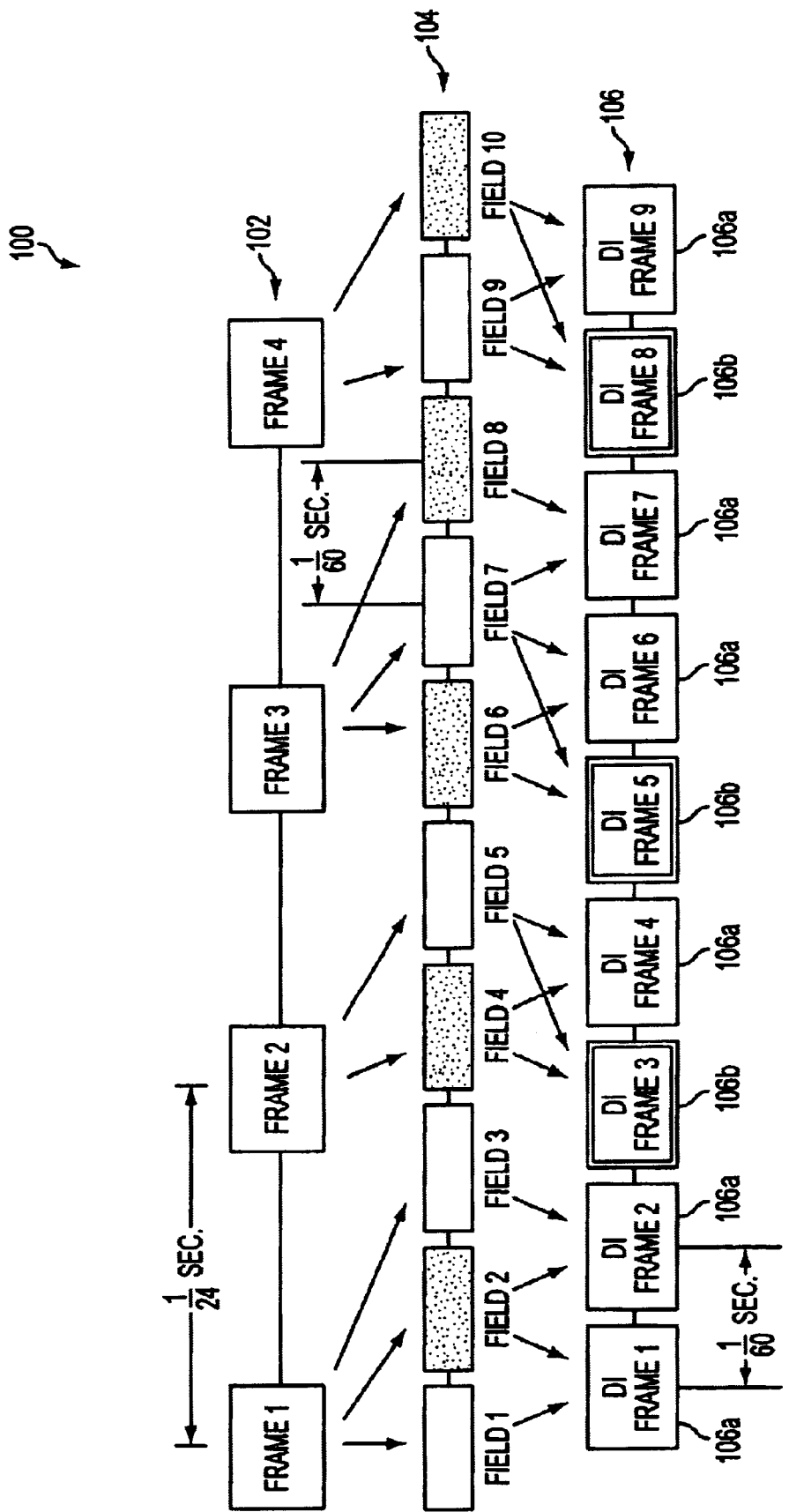
FIG. 11 illustrates a method of combining fields into frames in a deinterlacing process in accordance with one embodiment of the present invention.

FIGS. 1–10 were discussed with reference to the prior art. FIG. 11 illustrates a method 100 of combining fields into frames in a deinterlacing process in accordance with one embodiment of the present invention. A series of film frames 102 at 24 frames per second are converted to video fields 104 at 60 fields per second. The video fields are then converted to deinterlaced frames 106 by a deinterlacing process. The deinterlaced frames 106a are created by combining the two most recent fields into a single frame, but the deinterlaced frames 106b are created by combination of different video fields and distinguished by bold arrows and bold borders.

When Field 2 is the "current" field, then DI Frame 1 is created by combining Field 1 (the "last" field) and Field 2 (the "current" field). DI Frame 2 is created in the same way by combining Field 3 with Field 2 when Field 3 is the current field. In contrast, when Field 4 is the current field, combining Field 4 and Field 5 creates DI Frame 3. In this case, the combination is the "current" and the "next" fields. When the field combination is done in this way, all of the deinterlaced frames 106 will be created by combining fields that originate from the same source frame. Because these combining fields originate from the same source frame, they are time correlated. Therefore, no motion artifacts exist in the deinterlaced frames 106.

Combining fields into frames as shown in FIG. 11 requires identification of the type of motion picture used in the original source. First, a source must be identified to be one in which original progressive frames exist; second, the sequencing used to create fields from the frames of the original source must be determined in order to assemble video fields into frames and avoid artifacts.

Figure 12:
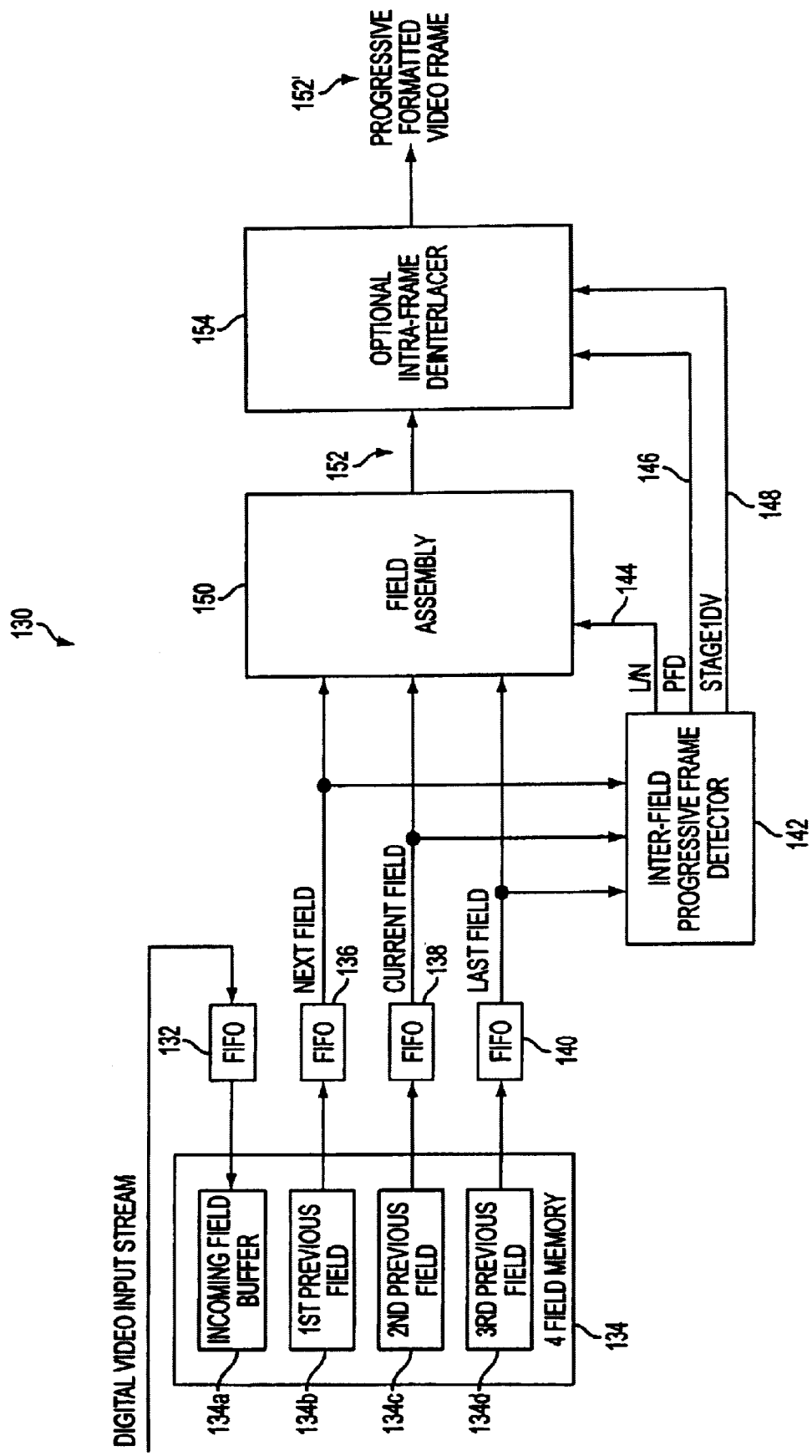
FIG. 12 is a block diagram of a video deinterlacer in accordance with one embodiment of the present invention.

FIG. 12 is a block diagram of a video deinterlacer 130 in accordance with one embodiment of the present invention. A digital video stream enters the deinterlacer 130 through a FIFO memory module 132 before being written into a digital memory unit 134. The digital memory unit 134 has the capacity to store four complete video fields in a set of field buffers 134a–d. The incoming field is written to each of the field buffers 134a–d in sequence. Therefore, the first incoming video field is written to field buffer 134a, the second incoming video field is written to field buffer 134b, etc. After field buffer 134d is filled, the next incoming video field is written to field buffer 134a again.

During the time period in which one field of the video stream is processed, the incoming field is written to one field buffer 134, and the three previous fields are read from the other field buffers 134. For example, if as shown in FIG. 12, the incoming field is written to 134a, then field buffers 134b–d are being read into a set of FIFO memories 136, 138, and 140. The FIFO memories 136, 138 and 140 are provided to accommodate the reading and writing of the four video fields into a single physical memory unit 134, and also to decouple the clocking domains of the incoming video, the memory unit 134, and the subsequent deinterlace processing stages.

The labeling of the field buffers in 134a–d as "incoming," "1st," 2nd," and "3rd" previous fields are from the point of view of the incoming video streams. The outputs of the three read FIFOs 136, 138, and 140 are labeled Next Field, Current Field, and Last Field respectively. This labeling is from the point of view of the deinterlace processor 130 and implies that deinterlace processing imposes a delay of approximately two field time periods on the video stream.

The outputs of FIFOs 136, 138, and 140 are synchronized so that the three fields presented to subsequent processing stages are spatially concurrent. The three fields are then presented as inputs to an inter-field progressive frame detector 142 which produces a last/next (L/N) signal 144, a progressive frame detection (PFD) signal 146 and a stage 1 detection value (Stage1DV) 148. The L/N signal 144 is a control signal that instructs a field assembly module 150 to assemble the Current Field with the Last Field or the Next Field, which are three sequential fields from the input video stream.

With the three fields, the field assembly module 150 produces a progressively formatted output frame 152. If the Current Field is even, then the Next and Last Fields must be odd and vice versa. Therefore, the progressively formatted frame 152 output of the field assembly module 150 will always be a combination of one even and one odd field. This is important because the correct assembly of fields into progressive frames requires one even field and one odd field for input.

The optional intra-frame deinterlacer 153 may provide additional processing to remove artifacts that occur within the output frame 152 under certain conditions, such as when the PFD signal 146 is not asserted. If the frame detector 142 detects that the incoming video signals were originally from a source that contains progressive frames, the PFD signal 146 is asserted. Three original types of source video are detected: film at 24 frames per second, computer animations or frames rendered at 30 frames per second, and still images, in which no motion occurs in the image over a period of several fields. When the PFD signal 146 is asserted, the optional processor 153 is disabled.

However, if the frame detector 142 is unable to detect a progressive frame sequence from the incoming video fields, then it will set the L/N signal 144 to always assemble Current and Last fields in the field assembly module 150. Then, the frame detector 142 de-asserts the PFD signal 146, which informs the optional deinterlacer 153 that artifacts may be present in the output frame 152 and that further processing may be necessary to remove the artifacts and create a final progressive output frame 152'.

Detection of a progressive frame sequence requires keeping a history of the preceding fields. However, the progressive frame detector 142 can look only one field ahead. In cases where a large transition in the image occurs, it is possible for the progressive frame sequence to change because of edits in the original video source. These changes could require changes in the way frames are created from incoming fields, but it is not possible to know in advance of the arrival of the incoming fields.

For this reason, the progressive frame detector 142 must be capable of detecting transitions in the motion picture because transitions may indicate edits that may change the progressive field sequencing. If a transition is detected, the progressive frame detector 142 will de-assert the PFD signal 146 for the time period required to determine if the progressive frame sequence has been broken. This allows motion artifacts to be removed by the optional deinterlacer 153 during the time period in which those artifacts may be present. In cases where a progressive frame sequence is not detected and the PFD output is not asserted, the Stage1DV 148 output contains magnitude information related to the amount of motion present in the image. This information may be used in the optional deinterlacer 153 to further process the image.

Figure 13:
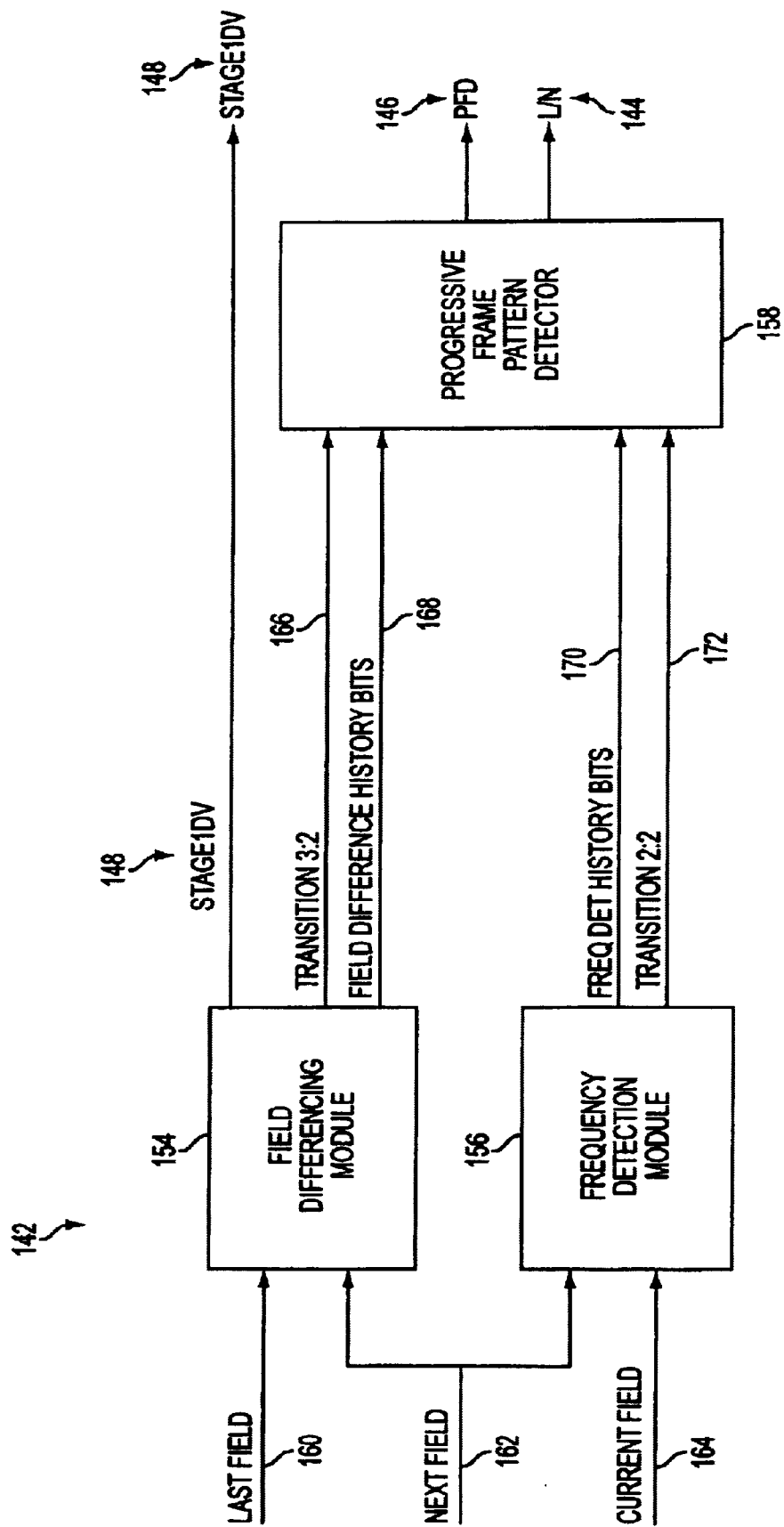
FIG. 13 is a system diagram of a progressive frame detector in accordance with one embodiment of the present invention.

FIG. 13 is a system diagram of a progressive frame detector 142 in accordance with one embodiment of the present invention. The frame detector 142 includes a field differencing module 154, a frequency detection module 156, and a progressive frame pattern detection (PFPD) module 158. The field differencing module 154 calculates the difference between a Next Field 162 and a Last Field 160, processes the differences into the Stage1DV 148, a transition detection 3:2 value 166, and a number of field difference history bits 168.

The frequency detection module 156 combines a Current Field 164 and the Next Field 162 into a frame and then detects the vertical high frequencies that result from motion artifacts. Then, the frequency detection module 156 outputs a number of frequency detection history bits 170 and a transition detection 2:2 value 172. Finally, the PFPD 158 takes as input the transition detection 3:2 value 166, the number of field difference history bits 168, the number of frequency detection history bits 170 and the transition detection 2:2 value 172 to produce the L/N signal 144 and the PFD signal 146.

Figure 14:
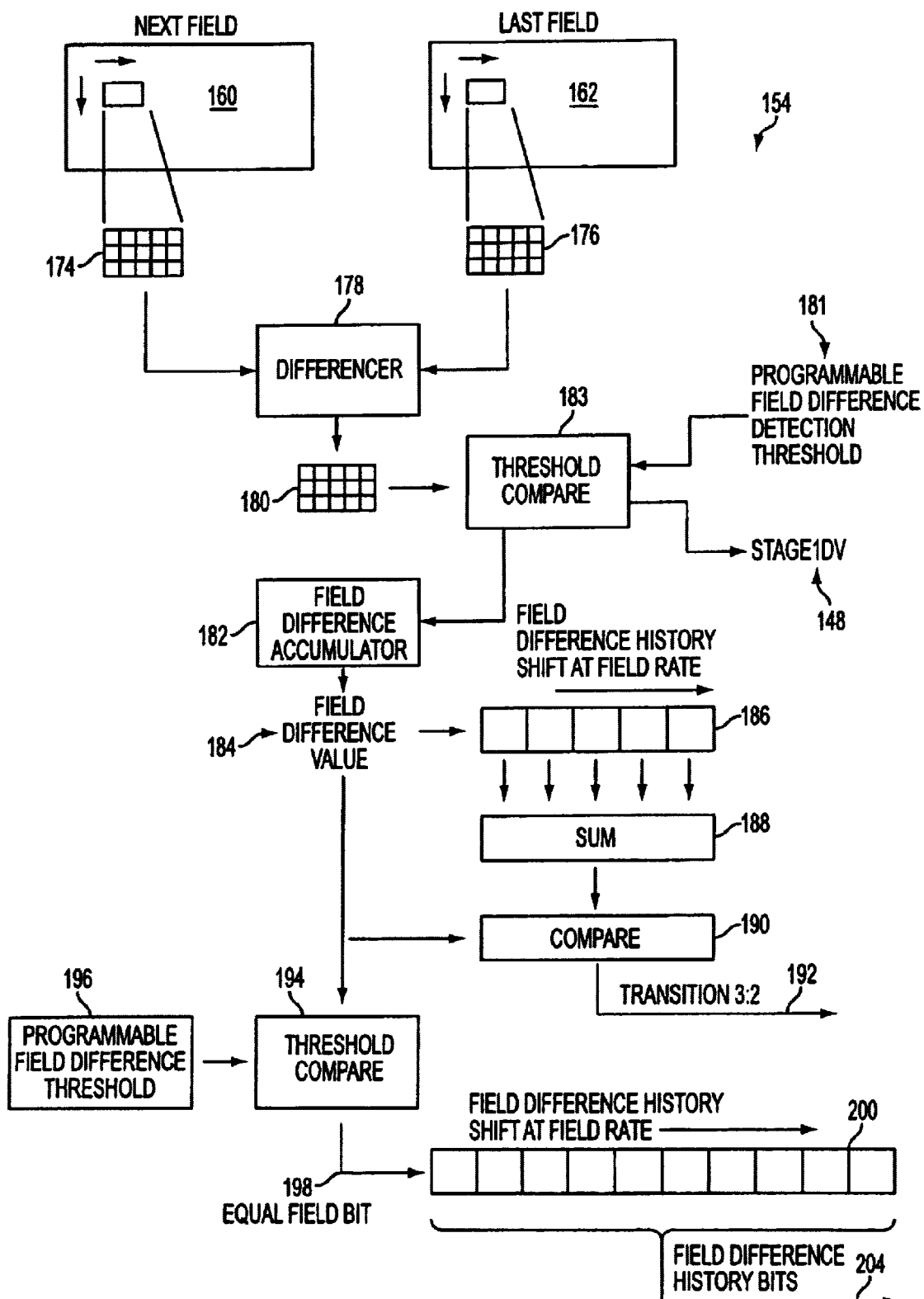
FIG. 14 is a flow diagram of the processing steps within a field-differencing module in accordance with one embodiment of the present invention.

FIG. 14 is a flow diagram of the processing steps within the field-differencing module 154 in accordance with one embodiment of the present invention. A Next array of pixels 174 which is a subset of the Next Field 160 and a Last array of pixels 176 which is a subset of the Last Field 162 comprise the inputs to a differencer 178. The Next and Last pixel arrays 174 and 176 can be viewed as windows moving across their respective fields. The "window" is moved from left to right and top to bottom. Each time the windows are moved, a new difference is computed. The differencer 178 generates an array of differences 180.

A weighted average of the array of differences 180 is computed. The weighting is such that the difference values near the center of the array of differences have the most influence on the weighted average. The weighted average of the differences 180 is compared in an operation 183 with a programmable threshold value 181, and values less than the threshold value are zeroed out. The result of the comparison operation 183 is output at the Stage1DV 148, and is also input into a field difference accumulator 182 that sums the differences over the entire field to produce a field difference value 184. The previous five field difference values are stored in a memory module 186 and are summed in an operation 188.

The sum of the previous five field difference values is compared to the current field difference value in an operation 190, and the result is the Transition 3:2 output signal 192. The current field difference value 184 is compared in a threshold operation 194 with the value in a programmable field difference register 196. The result of the threshold operation 194 is an equal field bit 198, which is a single bit that indicates that the Next Field 160 and Last Field 162 are the same. The previous field difference bits are stored in a memory module 200 and are used in the PFPD 158 of FIG. 13.

Figure 15:
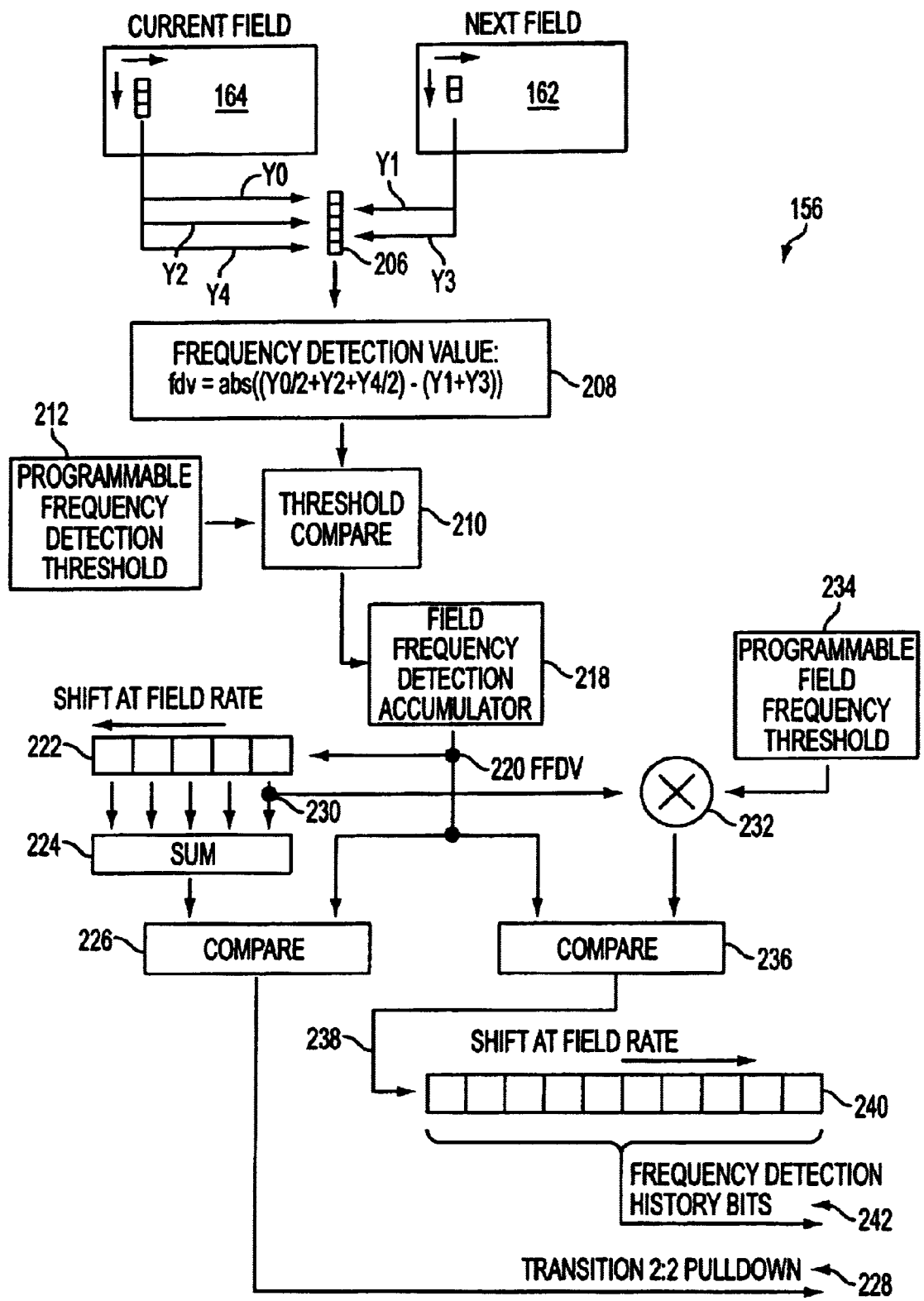
FIG. 15 illustrates the operation of the frequency detection module in accordance with one embodiment of the present invention.

FIG. 15 illustrates the operation of the frequency detection module 156 of the present invention. Vertically adjacent pixels from the Current Field 164 and the Next Field 162 are assembled, as they would appear spatially on a display 206. A frequency detection value is calculated in an operation 208. This calculation is performed to detect the frequencies that are associated with deinterlaced motion artifacts. The output of the frequency detection is compared in an operation 210 with a programmable threshold value 212, and values less than the threshold value are zeroed out.

The output of the operation 210 is accumulated over the entire field period in 218 to produce a field frequency detection value 220. The field frequency detection value 220 is stored in a memory module 222 that contains the previous 5 field frequency detection values. The five previous field frequency detection values are summed in an operation 224 and the results are compared to the current frequency detection value 220 in an operation 226. The result of this comparison in operation 226 is the Transition 2:2 bit 228, which indicates that a transition has occurred in the 2:2 sequence.

As part of a parallel process, a first previous field detection value 230 that was stored in the memory module 222 is transferred to a multiplier 232, and multiplied with a value stored in a programmable field frequency threshold register 234. The result of the multiplication is compared in an operation 236 to the current field frequency detection value 220. The result is a relative frequency difference bit 238, which is then stored in a memory module 240. The previous ten relative frequency difference bits 242 are output to the PFPD module 158.

Figure 16:
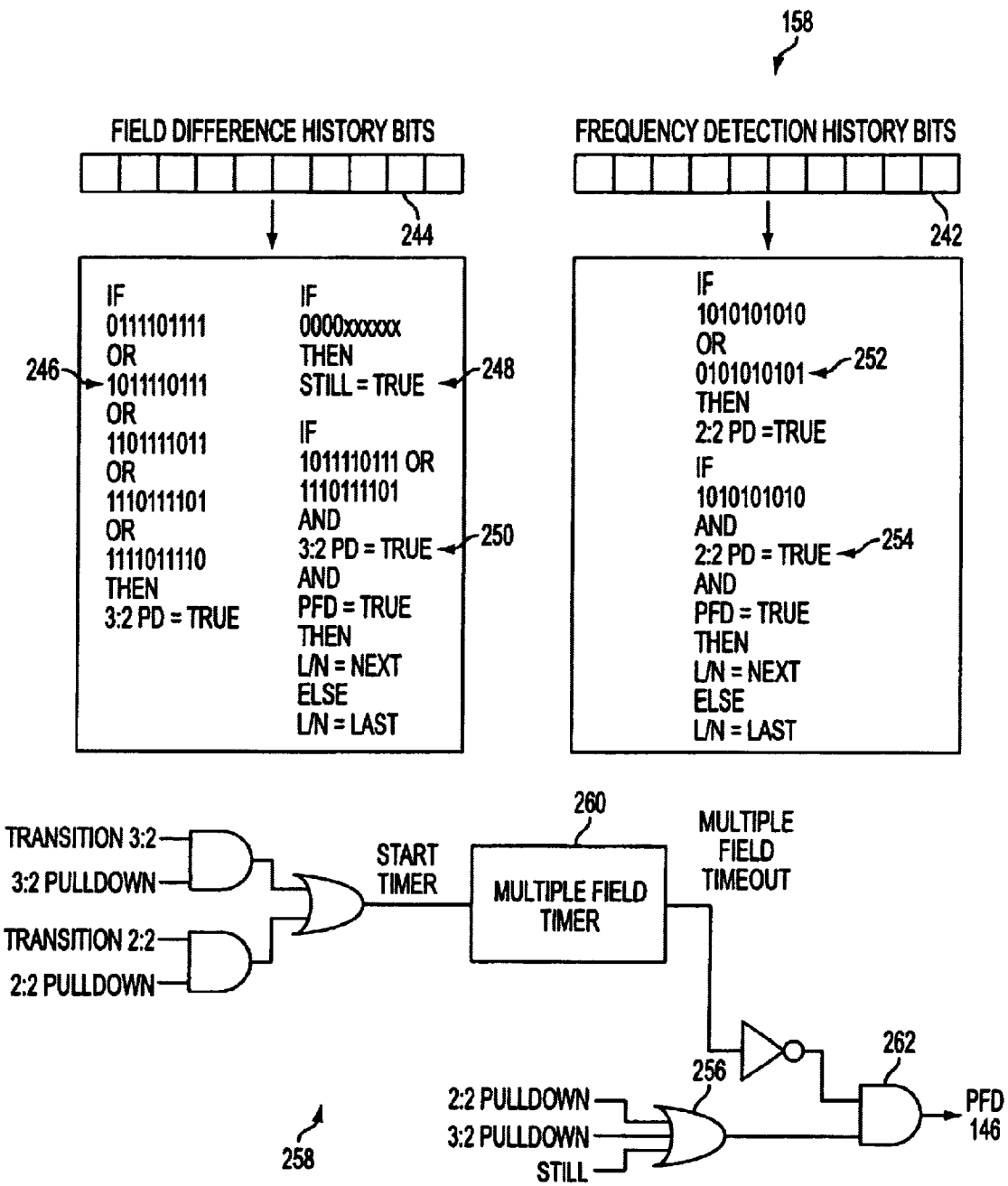
FIG. 16 is a system diagram of the PFPD module in accordance with one embodiment of the present invention.

FIG. 16 is a system diagram of the PFPD module 158 in accordance with one embodiment of the present invention. The PFPD module 158 performs logical operations on a set of field difference history bits 244, the frequency detection history bits 242, the transition 3:2 value 192, and the transition 2:2 value 228. From the input of the field difference history bits 244, a logical operation 246 determines the 3:2 pulldown detection bit by looking for patterns in which every fifth field is equal. Also, a logical operation 248 detects still images by setting the STILL bit when the most recent four field differences are zeros. The state of the L/N control signal is set by a logical operation 250.

From the input of the frequency detection history bits 242, a logical operation 252 determines a 2:2 pulldown detection bit by searching for alternating patterns of high frequency content in successive fields. Then, a logical operation 254 determines the L/N control signal for the 2:2 pulldown case. The PFD signal 146 is determined from the 3:2 pulldown detection bit, the transition 3:2 value 192, the 2:2 pulldown bit, and the transition 2:2 value 228.

Three source types of progressive frames are detected. Film converted to video using 3:2 pulldown is detected by computing the difference between pairs of even fields or pairs of odd fields and looking for the condition in which every fifth difference is zero. This condition is indicated by the 3:2 pulldown signal. 30 frame/second progressive video sources using 2:2 pulldown are detected using a frequency detection method which looks for the frequencies associated with motion artifacts in every second combined frame, indicated by the 2:2 pulldown signal. Still images are detected when the field differences are zero for several consecutive fields, indicated by the STILL signal.

Progressive frames are simply the logical OR of these three signals as shown by a logical OR gate 256. However, transitions must also be taken into account. As mentioned above, a transition is a large change in the field sequence that result from edits, or dropout of the video signal. If a large change is detected, then progressive frame detection, which depends on a history of several fields, may be unreliable for the period required to establish that the progressive frame pattern has been broken. In the examples illustrated, this period consists of multiple field periods and varies depending on the type of source detected.

In a set of logical operation 258, a pulse is generated under two conditions. One is that a 3:2 pulldown sequence is detected and a transition occurs; the second is a 2:2 pulldown sequence is detected and a transition is detected in the sequence. Either of these cases triggers a timer 260, which generates a pulse of a multiple field duration, sufficient to establish that the progressive sequence has been broken. During this time, a logical AND gate 262 disables the PFD bit 146. As mentioned previously, if the PFD bit 146 is not asserted, then the optional intra-frame deinterlace processor 153 (illustrated in FIG. 12) may remove motion artifacts during the timeout period.

It will therefore be appreciated that the progressive frame detecting process of the present invention provides for elimination of edge artifacts in a video image. This is accomplished by identifying the source type of the original motion picture and determining a sequencing of the input video stream if the source type uses progressive scanning. The information is then used to reassemble video fields in the deinterlacing process. The combination of these techniques provides a low-artifact, high-resolution deinterlaced image.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A digital image processor comprising:
   an input buffer operable to receive an interlaced video stream;
   digital memory for storing portions of the interlaced video signal;
   an output buffer operable to transmit a deinterlaced video stream; and
   a deinterlacing processor coupled between said input buffer and said output buffer and to said digital memory, said deinterlacing processor operable to store portions of said received interlaced video stream from said input buffer into said digital memory and to detect the source type of said received interlaced video stream and to generate said deinterlaced video output stream having reduced or no motion artifacts wherein a transition after a 2:2 pulldown sequence or after a 3:2 pulldown sequence initiates a timeout period.

2. A digital image processor as recited in claim 1, wherein the deinterlacing processor includes a field assembly module for generating a progressively scanned output frame.

3. A digital image processor as recited in claim 2, wherein the deinterlacing processor includes an inter-field progressive frame detector coupled to the field assembly module, said inter-field progressive frame detector operable to receive a set of fields from the portions of the received interlaced video stream and generate a set of signals that control the field assembly module.

4. A digital image processor as recited in claim 3, wherein the set of signals includes a last/next field signal, a progressive frame detection signal and a stage 1 detection value.

5. A digital image processor as recited in claim 4, wherein the inter-field progressive frame detector includes:

a progressive frame pattern detector operable to generate the progressive frame detection signal and the last/next field signal;

a field differencing module coupled to said progressive frame pattern detector, said field differencing module operable to generate the stage 1 detection value, a transition 3:2 value, and a plurality of field difference history bits; and a frequency detection module coupled to said progressive frame pattern detector, said frequency detection module operable to generate a plurality of frequency detection history bits and a transition 2:2 value.

6. A digital image processor as recited in claim 3, further comprising:

a FIFO memory module coupled to the digital memory, said FIFO memory operable to receive the interlaced video stream; and a set of FIFO memories coupled to the digital memory, the inter-field progressive frame detector and the field assembly, said FIFO memories operable to store a next field, a current field, and a last field.

7. A digital image processor as recited in claim 3, wherein the deinterlacing processor further comprises an optional intra-frame deinterlacer module to provide additional processing to remove motion artifacts when it is determined that the interlaced video stream is not from a progressive frame source.

8. A method for deinterlacing an interlaced video stream comprising:

receiving a set of video fields from an input of said interlaced video stream;

analyzing a plurality of pixels from said set of video fields to determine a source type of said interlaced video stream wherein;

detecting the sequencing of said interlaced video stream if said source type of said interlaced video stream contains progressive frames wherein a transition after a 2:2 pulldown sequence or after a 3:2 pulldown sequence initiates a timeout period;

assembling said set of video fields into a deinterlaced video frame with reduced or no motion artifacts using said source type and said sequencing of said interlaced video stream as a control.

9. A method for deinterlacing an interlaced video stream as recited in claim 8, wherein the analyzing the set of video fields includes determining a magnitude of motion between pairs of video fields.

10. A method for deinterlacing an interlaced video stream as recited in claim 9, wherein the determining the magnitude of motion includes field differencing between the pairs of video fields to generate a set of field difference values.

11. A method for deinterlacing an interlaced video stream as recited in claim 10, wherein the determining the magnitude of motion further includes generating a weighted average of the set of field difference values.

12. A method for deinterlacing an interlaced video stream as recited in claim 9, wherein the determining the magnitude of motion further includes determining whether the set of field difference values exceeds a threshold value and generating a set of thresholded field difference values.

13. A method for deinterlacing an interlaced video stream as recited in claim 12, wherein the determining the magnitude of motion further includes comparing the set of thresholded field difference values to a programmable threshold value and generating a field difference history bit indicating motion between field pairs.

14. A method for deinterlacing an interlaced video stream as recited in claim 8, wherein the detecting a sequencing of the interlaced video stream includes determining whether the source type of the interlaced video stream is a 3:2 pulldown video source by comparing a set of field difference history bits with a 3:2 pulldown pattern.

15. A method for deinterlacing an interlaced video stream as recited in claim 14, wherein the detecting a sequencing of said interlaced video stream includes detecting a transition in the interlaced video stream.

16. A method for deinterlacing an interlaced video stream as recited in claim 8, wherein the analyzing the set of video fields includes performing frequency analysis upon video frames formed by combining adjacent field pairs from the received interlaced video stream.

17. A method for deinterlacing an interlaced video stream as recited in claim 16, wherein the analyzing the set of video fields further includes comparing a set of frequency detection values with a programmable threshold value to generate a set of thresholded frequency detection values.

18. A method for deinterlacing an interlaced video stream as recited in claim 10, wherein the analyzing the set of video fields further includes comparing the set of thresholded frequency detection values to a previous set of thresholded frequency detection values to generate a frequency detection history bit.

19. A method for deinterlacing an interlaced video stream as recited in claim 18, wherein the detecting a sequencing of the interlaced video stream includes determining whether the source type of the interlaced video stream is a 2:2 pulldown video source by comparing a set of frequency detection history bits with a 2:2 pulldown pattern.

20. A method for deinterlacing an interlaced video stream as recited in claim 19, wherein the detecting a sequencing of said interlaced video stream includes detecting a transition in the interlaced video stream.

* * * * *